(12) United States Patent
Feeney

(10) Patent No.: US 11,982,096 B2
(45) Date of Patent: May 14, 2024

(54) POOL FILTRATION SYSTEM

(71) Applicant: Stephen A. Feeney, Belleville (CA)

(72) Inventor: Stephen A. Feeney, Belleville (CA)

( * ) Notice: Subject to any disclaimer, the term of this patent is extended or adjusted under 35 U.S.C. 154(b) by 0 days.

(21) Appl. No.: 17/569,953

(22) Filed: Jan. 6, 2022

(65) Prior Publication Data
US 2022/0213709 A1    Jul. 7, 2022

Related U.S. Application Data

(60) Provisional application No. 63/134,453, filed on Jan. 6, 2021.

(51) Int. Cl.
*E04H 4/12* (2006.01)
*C02F 1/00* (2023.01)
*C02F 103/42* (2006.01)

(52) U.S. Cl.
CPC .......... *E04H 4/1209* (2013.01); *C02F 1/001* (2013.01); *C02F 2103/42* (2013.01); *C02F 2201/005* (2013.01); *C02F 2201/006* (2013.01); *C02F 2201/78* (2013.01); *C02F 2303/16* (2013.01)

(58) Field of Classification Search
CPC ..... E04H 4/1209; E04H 4/1245; C02F 1/001; C02F 2103/42; C02F 2201/005; C02F 2201/006; C02F 2201/78; C02F 2303/16; C02F 1/76; C02F 1/78; C02F 2301/046; B01D 35/12; B01D 35/143
USPC ....................................................... 210/167.1
See application file for complete search history.

(56) References Cited

U.S. PATENT DOCUMENTS

| | | | |
|---|---|---|---|
| 3,365,064 A | 1/1968 | Horan | |
| 4,248,714 A * | 2/1981 | Acosta | B01D 29/52 210/450 |
| 4,545,905 A | 10/1985 | Poe | |
| 5,505,844 A | 4/1996 | Porter | |
| 11,331,616 B2 * | 5/2022 | Henderson | B01D 29/58 |
| 2007/0193944 A1 * | 8/2007 | Han | C02F 1/004 210/411 |
| 2012/0132581 A1 * | 5/2012 | Williams | B01D 29/66 210/340 |
| 2014/0061117 A1 * | 3/2014 | Borough | B01D 35/143 210/337 |

* cited by examiner

*Primary Examiner* — Ekandra S. Miller-Cruz
(74) *Attorney, Agent, or Firm* — Smart & Biggar LP

(57) ABSTRACT

The invention relates to a pool filtration system for a pool, having a primary filter and a backwash filter, as well as a backwash return conduit, by which, when the pool is being backwashed, the water is directed to the backwash filter, then to the backwash return conduit and back to the pool. The system allows for recycling of backwash water back into the pool.

10 Claims, 4 Drawing Sheets

POOL FILTRATION SYSTEM

CROSS-REFERENCE TO RELATED APPLICATION

This application claims the benefits of priority to U.S. Provisional Patent Application No. 63/134,453, filed Jan. 6, 2021, titled POOL FILTRATION SYSTEM, the contents of which are hereby expressly incorporated into the present application by reference in their entirety.

FIELD OF THE INVENTION

The present invention relates to a pool filtration system that comprises a backwash filter. The backwash filter allows for reintroduction of filtered backwash water into the pool.

BACKGROUND OF THE INVENTION

Swimming pool filtration systems typically include a drain discharge connected to the intake of a pump by a suction line to withdraw water from the pool. The suction line usually includes a skimmer for removing large debris before the water flows to a main filter that filters dirt, sediment, and other contaminants from the water. In a large proportion of residential swimming pools, this main filter is a sand filter. The filtered water is then returned back to the pool.

Over time, the collected dirt and debris in the filter slows down the water flow and generally decreases the overall efficiency of the unit. Pressure gauges at the filter inlet and outlet give the pool owner an idea of the blockage level inside. If gauges show pressure that exceeds a certain level, then it is time to clean the filter through a backwash operation. To backwash, typically a valve at the filter is actuated to connect the pipe from the pump to the outlet pipe and connect the drainage pipe to the inlet pipe. With this arrangement, water from the pump pushes up through the sand, dislodging the dirt and debris. At the top of the filter tank, the backwash water, containing much of the dirt and debris, flows out through the drainage pipe.

After the backwashing is finished, this contaminated water is typically disposed of in a variety of ways, such as into a storm drain, a sewer, a local creek etc. None of those are preferred options, and may actually be illegal in certain areas. The backwashed water is typically chemically treated, and can damage plant life, aquatic life, and groundwater. Backwashing is typically a necessary step for most pool filter systems, but it is an undesirable one, not only because of the environmental concerns. For example, backwashed water needs to be replaced with new water for the pool, which adds expense. Typically, and especially in northern climates, pool water is heated, so warm backwashed water is replaced with cold new water, which needs to be heated again, also adding expense.

U.S. Pat. No. 5,505,844 discloses a swimming pool filtration system comprising a pump, sand filter, and a backwash filtering system. U.S. Pat. No. 3,365,064 discloses a swimming pool filtration system comprising a pump, a main filter, a backwash filter, and multiple valve assemblies. When a valve stem is in a certain position, such as during a backwash procedure, valve elements occlude certain valve openings that block off the pump discharge line to the pool. The backwash carrying sediment is then diverted to the backwash filter 13. U.S. Pat. No. 4,545,905 discloses a filter backwash system in combination with a swimming pool. The system comprises a pump, filter canister, and backwash filter. When the filter medium needs cleaning, the system is backwashed, after which backwashed water exits the filter canister and enters the backwash filter. These three references are incorporated herein by reference.

A need exists for an efficient pool filtration system that filters backwash water for reintroduction back into the pool.

SUMMARY OF THE INVENTION

According to one aspect of the invention is provided a pool filtration system for a pool, comprising: an intake conduit in fluid connection with said pool, for drawing water from the pool; a return conduit in fluid connection with said pool and with said intake conduit, for returning water to the pool; a circulation pump for circulating water within the system; a valve with at least a first, operating position and a second, backwash position; a primary filter; a backwash filter; and a backwash return conduit; wherein, when the valve is in the operating position, water is directed from the intake conduit to the primary filter in a filtering direction, then to the return conduit and back to the pool; and wherein, when the valve is in the backwash position, water is directed from the intake conduit to the primary filter in a backwash direction which is opposite to the filtering direction, then to a backwash conduit to the backwash filter, then through the backwash return conduit and back to the pool.

According to a further aspect of the invention is provided a backwash filter for the pool filtration system as herein described, wherein the backwash filter comprises: a substantially tubular housing having a sealed lower portion, a middle portion, and an upper portion, having an inlet which directs incoming water towards the lower portion, and having a removable cap on its upper portion; a water filter retainer within said housing and in its middle portion, configured to retain a water filter to form a water tight seal between the lower portion and the upper portion such that, when a water filter is retained within the water filter retainer, water travelling from said lower portion to said upper portion must travel through the water filter; said cap having an outlet for directing water out of the upper portion.

In certain embodiments, said inlet is angled to direct water towards the bottom of the lower portion.

In certain embodiments, the water filter is spring mounted onto the water filter retainer.

In certain embodiments, the water filter is disposable.

In certain embodiments, the water filter is a paper cartridge filter.

In certain embodiments, the water filter is a cloth filter.

In certain embodiments, the water filter is reusable and cleanable.

In certain embodiments, the pool filtration system further comprises a water heater inline with said return conduit.

In certain embodiments, the pool filtration system further comprises an ozonator inline with said return conduit.

In certain embodiments, the pool filtration system further comprises a chlorinator inline with said return conduit.

In certain embodiments, the pool filtration system further comprises a salt ionizer inline with said return conduit.

In certain embodiments, the valve is configured to be operated manually.

In certain embodiments, the valve is configured with a motor so that it may be switched from the first position to the second position with a switch.

In certain embodiments, the valve is configured with a motor, and the return conduit is configured with a pressure sensor, so that when a low pressure threshold is met, the valve automatically switches from the first position to the second position, then automatically switches back to the first position after a defined period of time.

BRIEF DESCRIPTION OF THE DRAWINGS

The present invention will now be described in more detail having regard to the drawings in which.

DETAILED DESCRIPTION OF THE INVENTION

A better understanding of the present invention and its objects and advantages will become apparent to those skilled in this art from the following detailed description, wherein there is described only the preferred embodiment of the invention, simply by way of illustration of the best mode contemplated for carrying out the invention. As will be realized, the invention is capable of modifications in various obvious respects, all without departing from the scope and spirit of the invention. Accordingly, the description should be regarded as illustrative in nature and not as restrictive.

Figure 1:
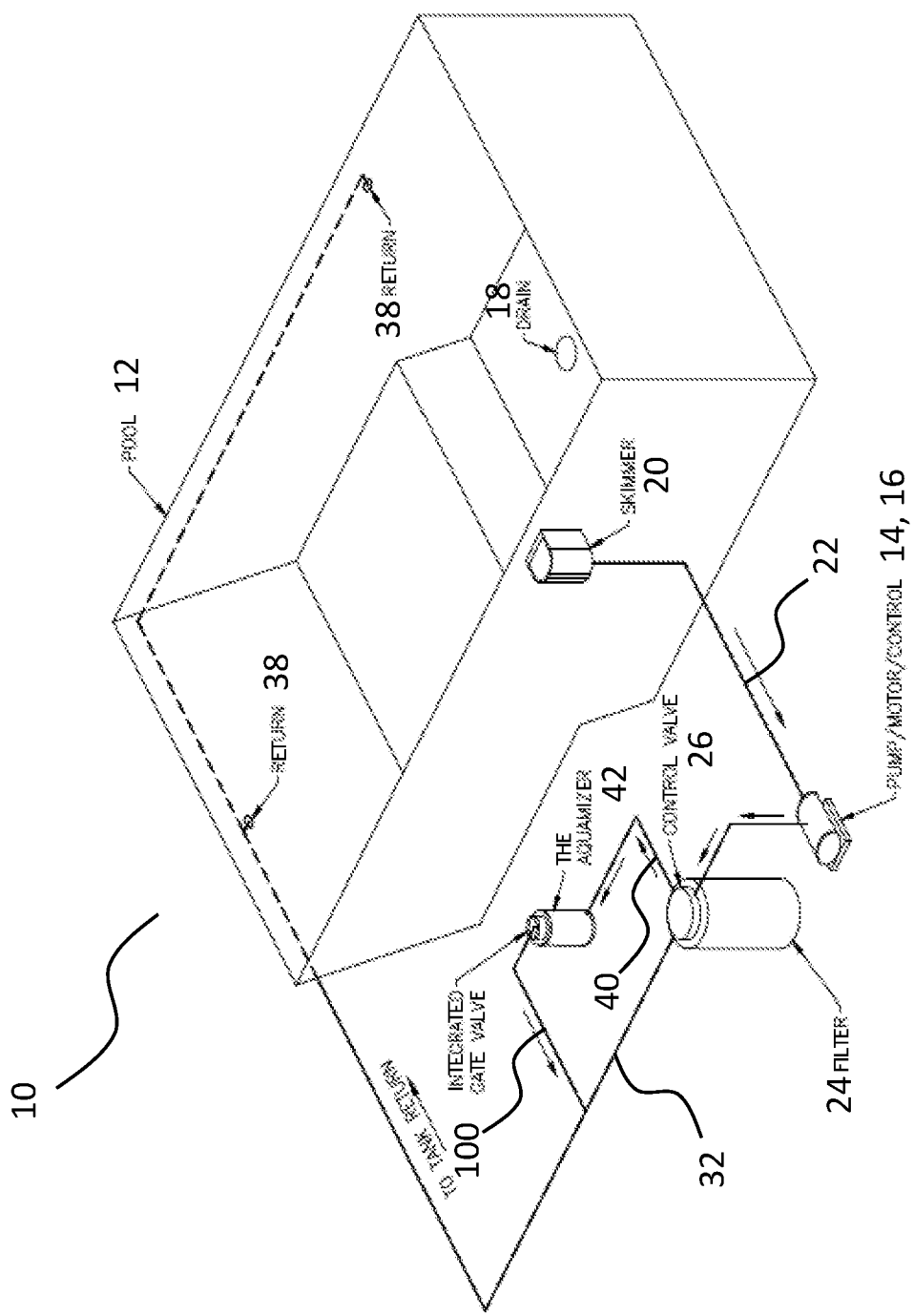
FIG. 1 is a pictorial diagram illustrating an embodiment of the pool filtration system.

FIG. 1 shows an exemplary embodiment of a pool filtration system 10. In this system 10, a pool 12, such as an in-ground swimming pool 12, will have a pump 14 actuated by a motor 16 that creates negative pressure to pull water from the pool 12. Depending upon the size of the pool 12, the water can be extracted from the pool 12 via one or more drains 18. One or more drains (not shown) located near the surface of the pool 12 will preferably direct the drained water into a skimmer 20. Skimmers 20 help to capture large debris, such as leaves, twigs, dead insects, etc., before this waste can sink to the bottom of the pool, or before the debris makes its way to the pool filter 24. Once through the skimmer 20, the water is directed to the pool filter 24 via a conduit 22. Alternatively or in parallel, as shown in FIG. 1, water may exit the pool 12 via a drain 18, such as a drain at or near the bottom of the pool 12, which can either bypass skimmer 18 or be routed through skimmer 18 and directed through a conduit 22 straight to the pool filter 24.

Pump 14 may optionally also have a basket-type filter (not shown) for filtering larger particulate matter missed by the skimmer basket.

The system may have additional elements, not shown in FIG. 1 but which are common to pool systems. These additional elements may include, for example, a chlorinator, typically located downstream of the filter, for introducing chlorine into the water, or, typically alternatively to the chlorinator, but in some instances in addition to the chlorinator, a salt ionizing system for ionizing salt contained within the water (in the case of a salt water pool). Additional elements may also include a water heater or heat exchange system, for adjusting the temperature of the water, and a variety of sensors including a thermostatic sensor, an ion content sensor, an ozonator, etc.

During a normal filtering operation of the system 10, a valve 26 directs the drained water into the pool filter 24 via an inlet, which is typically located near the top of the filter 24. The pool filter 24 can be any type of filter, such as a sand filter, or a diatomaceous earth filter. The filter is designed to filter particulate matter smaller than what may have been captured in the skimmer bucket or pump basket filters. After the water passes through the filter 24, it exits the filter through an outlet. The valve 26 directs the filtered water to a return conduit 32, through which it is pumped back to the pool 12 through a return opening 38.

When necessary, the valve 26 can be adjusted to place the system 10 in a backwash operation. In this operation, the valve 26 will now direct water drained from the pool 12 through the filter 24 in a direction reverse to what occurs during the normal filter operation. During the backwash operation, the water enters the filter 24 through the outlet, disrupts the filtration media in the filter 24 to dislodge debris and sediment caught in the filter 24, and ultimately carries much of this debris and sediment as it exits the filter 24 through the inlet where it arrives back at the valve 26.

The water exiting the filter 24 during the backwash operation will typically contain at least some amount of debris or contaminant that has been removed from the filtration media in the filter 24. While prior art systems typically disposed of this water in e.g. storm drains, sewers, etc., when the valve 26 is adjusted to place the system 10 in a backwash operation, access to the return conduit 32 is blocked. Rather, the valve 26 directs the backwash water leaving the filter 24 through a backwash conduit 40 to a backwash filtration unit 42 where it enters via an inlet 48 for further processing. A backwash conduit valve may be connected to the backwash conduit 40 to further control the flow of the backwash water.

Figure 2:
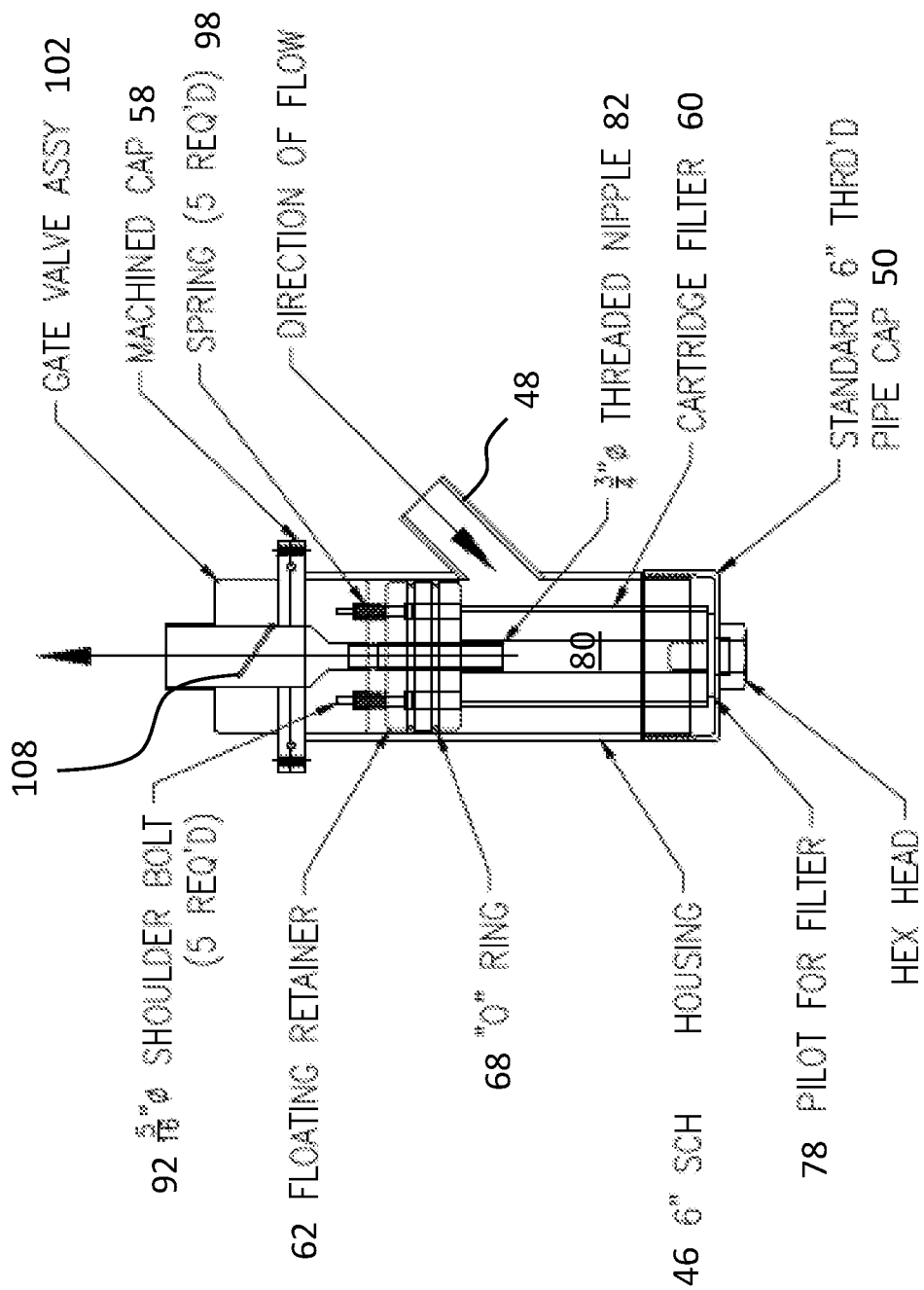
FIG. 2 is a cross-sectional view of a backwash filtration unit according to an embodiment of the present invention.
Figure 3:
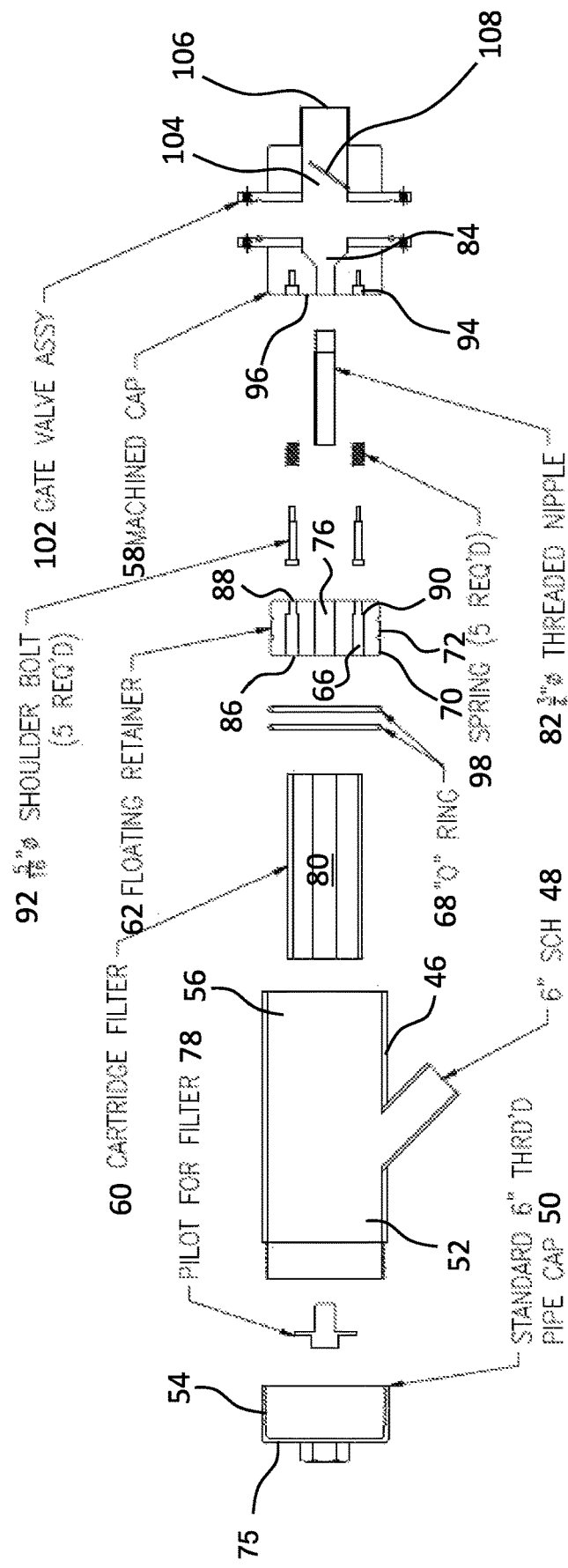
FIG. 3 is an exploded view of the backwash filtration unit as shown in FIG. 2.

An embodiment of the backwash filtration unit 42, as seen in FIGS. 2 and 3, comprises a housing 46 that is illustrated as being substantially tubular, with the exception of an inlet 48. The inlet is preferably angled as shown in FIGS. 2 and 3, as this will direct the incoming backwash water toward a lower portion of the filtration unit 42. A housing cap 50 is removably attached to a first end 52 of the housing 46, such as through a threaded connection 54 as illustrated in the Figures. Alternatively, the housing cap 50 could be attached to the housing 46 through e.g. a press fit, a snap fit, or via a fastener, such as a screw or a latch. The removable nature of the housing cap 50 facilitates access to the inside of the housing 46, which facilitates the cleaning or changing of the filter 60. The opposing second end 56 of the housing 46 is enclosed with a top cap 58. The top cap 58 is shown as attaching to the housing 46 through a snug press fit, however, other means known to one of skill in the art can be used to attach the second cap 58 to the housing 46.

Inside the housing 46 is a cartridge filter 60. The size of the housing 46 of the backwash filtration unit 42, and thereby the size of the cartridge filter 60, can vary depending upon the size of the pool 12 and volume of water to be filtered. A filter 60 having a larger surface area is desirable, as it should decreases clogging thereof, which will increase the time required between cleaning or replacement thereof. The filter may be a cartridge filter. It may be, for example, a paper cartridge filter, or it may be a cloth filter. It may be reusable, and washable by removing the filter and washing it down with a hose, or it may be disposable. Other types of filters are also contemplated for use within the backwash filter 42.

A retainer 62 receives a first end 64 of the filter 60, such as through slots 66 in the retainer 62. The retainer 62 has a diameter slightly less than the inner diameter of the housing 46, and serves to retain the filter 60 in place within the housing 46 through a press fit. To further secure the retainer 62 in place within the housing 46, one or more seals 68 can be placed around the exterior edge 70 of the retainer 62. For example, as can be seen in FIG. 3, the exterior edge 70 of the retainer 62 has at last one annular depression 72 configured to receive the one or more seals 68. Not only will the seals 68 reinforce the positioning of the retainer 62 inside the housing, they will create a substantially water tight seal between a lower portion of the interior of the housing 46, and an upper portion of the housing 46 above the retainer 62. The opposing second end 74 of the filter 60 is secured against the interior face 75 of the housing cap 50, and the open second end 74 of the filter is capped with a pilot filter 78.

The retainer 62 also serves to cap the open first end 64 of the filter 60. Within the retainer 62, there is a retainer channel 76 that extends across the length of the retainer 62. A tube 82 connects the retainer channel 76 with an exit channel 84 that extends across the length of the top cap 58. The tube 82 can attach to the retainer channel 76 and the exit channel 84 through any known means, such as a threaded connection or a press fit means. The retainer channel 76—tube 82—exit channel 84 pathway provides for fluid communication between an interior 80 of the filter 60 and the exterior of the backwash filtration unit 42. The cross section of the exit channel 84 may be linear throughout, or may flare outward, or have a cone or pyramid shape, to provide a broader opening at the exterior of the backwash filtration unit 42, which may be necessary to couple with exterior conduits.

In one embodiment as shown in the Figures, a gate valve assembly 102 is attached to the cap 58. The gate valve assembly 102 has an interior channel 104 contained therein, that when attached to the cap 58, fluidly connects the exit channel 84 with an outlet 106. The gate valve assembly can contain a known gate valve 108 to restrict or release the flow of water from the backwash filter 42.

In one embodiment, additional means are utilized to secure the retainer 62 in place. As can be seen in FIG. 3, the slots 66 are not uniform across their length. A first end 86 of a slot 66 has a larger diameter than the opposing second end 88 of the slot 66. Such an arrangement creates an edge 90 that is able to receive a head portion of a fastening member 92, such as a bolt. The fastening member 92 extends through the first end 86 of the slot 66 until its head portion is retained by the edge 90. The body of the fastening member 92 extends through second end 88 of the slot 66, and is ultimately received by an aperture 94 on the interior face 96 of the top cap 58. Preferably, a biasing member 98, such as a spring, is placed over the body of the fastening member 92. The biasing member 98 extends between an interior face of the top cap 58 and the retainer 62, and places pressure on the retainer 62, forcing it toward the filter 60. This serves to further keep the retainer 62 in place within the housing 46, and places additional pressure to secure the filter 60 in place between the retainer and the housing cap 50.

As the backwash water enters the backwash filtration unit 42 through the inlet 48, it will be filtered to remove debris as it passes through the filter 60. Once it reaches the interior 80 of the filter, pressure from incoming backwash water will propel the filtered water up through the retainer channel 76-tube 82-exit channel 84 pathway, and if applicable, the outlet 106, at which point the filtered backwash water will exit the backwash filtration unit 42.

A backwash return conduit 100 is fluidly attached to the exterior opening of the exit channel 84 or outlet 106, and directs the now filtered backwash water to the return conduit 32 to be returned to the pool via one or more return openings 38. Flow of water in the backwash return conduit 100 can optionally be further controlled by a return valve (not shown).

Figure 4:
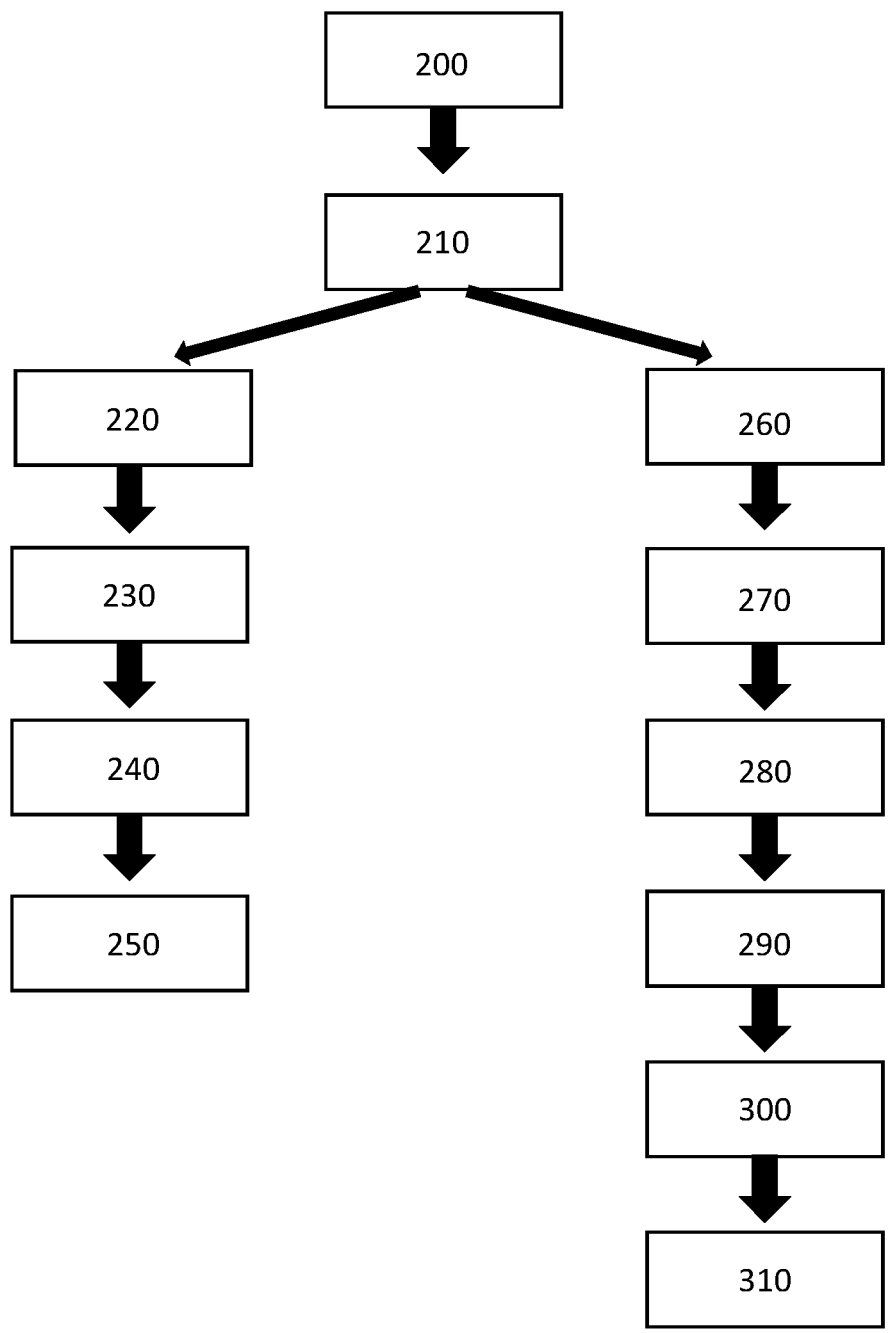
FIG. 4 is a block diagram illustrating a method for pool filtration according to an embodiment of the present invention.

FIG. 4 illustrates a block diagram of an embodiment of filtering water from a pool 12. Step 200 includes pumping water from the pool 12 via a pool pump 14. Step 210 includes optionally subjecting the pumped water to skimming via a skimmer 20 to remove large debris.

During a normal filtration operation (left side of the flow chart), a valve 26 will be actuated accordingly, which will direct the pumped water into a filter 24 via an inlet (Step 220). Step 230 includes filtering the water in the filter 24. After filtration, the water is directed through an outlet of the filter 24 (Step 240). The valve 26 directs the filtered water through a return conduit back to the pool (Step 250).

Alternatively, during a backwash filtration operation (right side of the flow chart), the valve 26 will be actuated accordingly. Step 260 includes reversing flow of the pumped water, and directing the water through into the filter 24 through the outlet. Step 270 includes disrupting the filtration media. Step 280 includes carrying debris and sediment out of the filter 24 through the inlet. The valve has blocked the return conduit 32, which results in Step 290 of directing the backwash water to a backwash filtration unit 42. Step 300 includes filtering the backwash water through the backwash filtration unit 42. The final step 310 includes returning the filtered backwash water to the pool 12 through an auxiliary return conduit 100.

The valve 26 may be actuated to switch from normal position to backwash filtration (i.e. the left side to the right side), and back, in a manual operation, such as by a user turning a switch on the valve cover. Alternatively, the valve may be operated electrically, for instance, with a small servo motor, which may be attached to an electric switch for user control, or to a controller which automatically switches from one position to another based, for example, on a pressure reading of the return conduit meeting a low threshold, or based on a period of time. This may be either factory set or user programmable. For example, a user may program the controller to switch to a backwash operation once a week, for 30 minutes. Other possible configurations would be evident to a person of skill in the art.

The invention claimed is:

1. A backwash filter for a pool filtration system, wherein the backwash filter comprises: a housing having a sealed lower portion, a middle portion, and an upper portion, having an inlet which directs incoming water towards the lower portion, and having a removable bottom cap on the lower portion; a top cap having an outlet for directing water out of the upper portion; a water filter secured between the lower portion of the housing and a water filter retainer; wherein the water filter retainer is located within said housing and in the middle portion, configured to retain the water filter to form a water tight seal between the lower portion and the upper portion such that, when the water filter is retained within the water filter retainer, water travelling from said lower portion to said upper portion must travel through the water filter; wherein the water filter retainer further comprises: slots, a retainer channel and a tube; each slot is configured to receive a fastening member so as to connect to the top cap; the tube extends therethrough the retainer channel; and wherein the water filter retainer is coupled to a spring extending between the top cap and the retainer such that the spring places pressure on the retainer; and wherein the backwash filter is configured to receive pressure from incoming backwash water.

2. The backwash filter of claim 1, wherein said inlet is angled to direct water towards the bottom of the lower portion.

3. The backwash filter of claim 1, wherein the water filter retainer is configured such that the water filter is spring mounted onto the water filter retainer.

4. The backwash filter of claim 1, wherein the water filter is disposable.

5. The backwash filter of claim 1, wherein the water filter is a paper cartridge filter.

6. The backwash filter of claim 1, wherein the water filter is a cloth filter.

7. The backwash filter of claim 1, wherein the water filter is reusable and cleanable.

8. The backwash filter of claim 1, wherein the tube comprises a through passage that permits liquid communication between an interior of the water filter and the upper portion of the housing.

9. The backwash filter of claim 8, wherein the tube that connects the through passage and to the outlet.

10. The backwash filter of claim 1, further comprising at least one sealing ring around the exterior edge of the water filter retainer.

* * * * *